United States Patent [19] [11] Patent Number: 4,843,117
Chung [45] Date of Patent: Jun. 27, 1989

[54] DIMETHYL SULFONE AS A SOLID SOLVENT FOR VINYLIDENE CHLORIDE CONTAINING POLYMERS

[75] Inventor: Chan I. Chung, Schenectady, N.Y.

[73] Assignee: The Dow Chemical Company, Midland, Mich.

[21] Appl. No.: 15,763

[22] Filed: Feb. 17, 1987

[51] Int. Cl.$^4$ .............................................. C08K 5/41
[52] U.S. Cl. .................................... 524/173; 524/568
[58] Field of Search ............................... 524/173, 568

[56] References Cited

U.S. PATENT DOCUMENTS 4,015,064  3/1977  Feldman et al. ..................... 528/491
4,426,477  1/1984  Yasumatsu et al. ................. 524/568

OTHER PUBLICATIONS

The Merck Index, Tenth Edition 1983, p. 475, Ref. #3254.

Primary Examiner—Joseph L. Schofer
Assistant Examiner—Peter D. Mulcahy

[57] ABSTRACT

The present invention relates to compositions and methods for reducing the melt viscosity of vinylidene chloride containing polymers having a majority of polymerized vinylidene chloride. The methods involve introducing a solid solvent into a vinylidene chloride containing polymer. The solid solvent is compatible with vinylidene chloride containing polymers at a processing temperature above the solid solvent melting point and will reduce the melt viscosity and improve processing of the vinylidene chloride containing polymer. Upon cooling below the solid solvent melting point the solid solvent will beocme microdispersed in the vinylidene chloride containing polymer with little or no solid solvent remaining dissolved in the vinylidene chloride containing polymer. One such solid solvent is dimethyl sulfone. The solid solvents are introduced into the vinylidene chloride containing polymer directly, or indirectly through the use of a polymer or additive containing the solid solvent which is blended into the vinylidene chloride containing polymer.

6 Claims, 4 Drawing Sheets

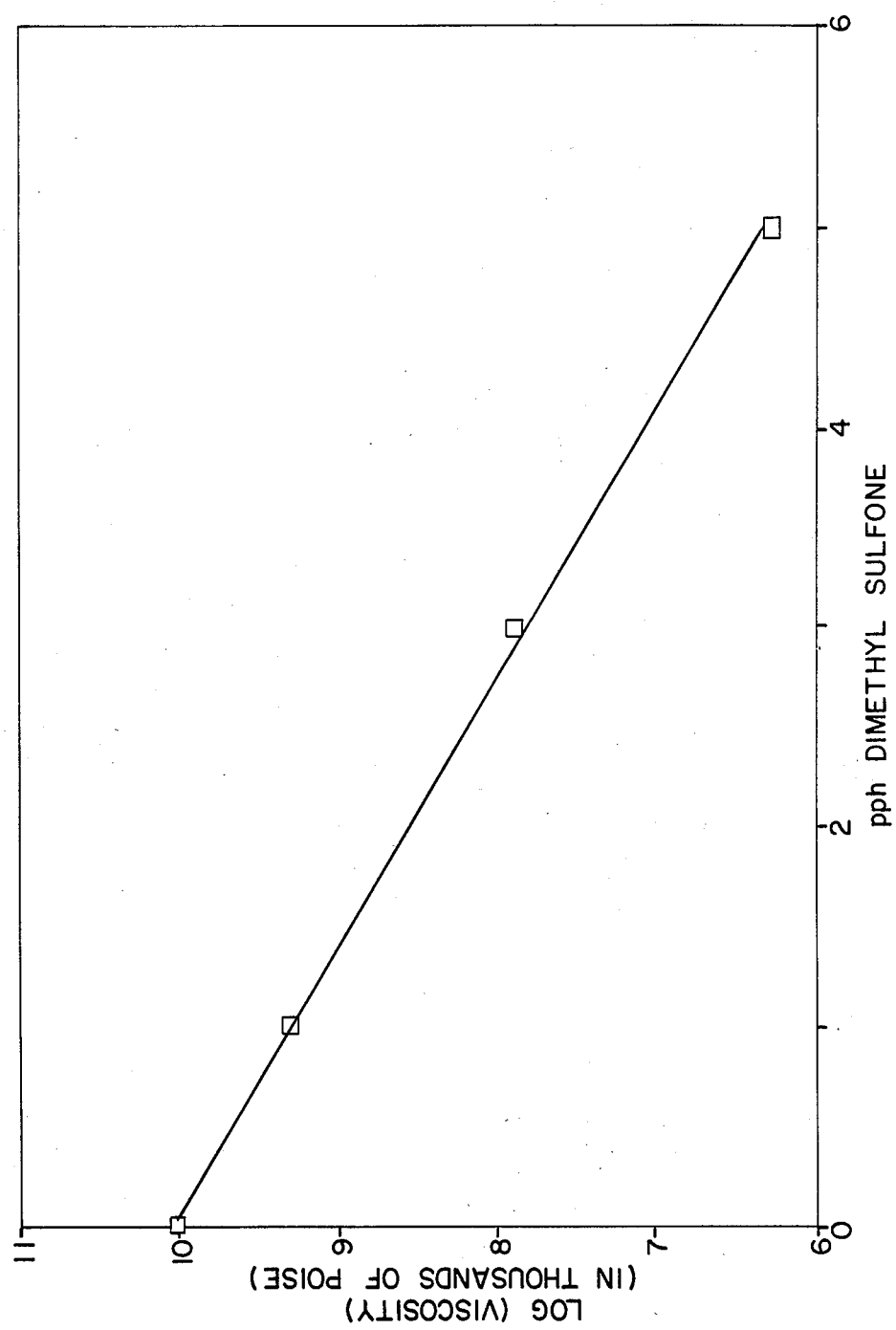

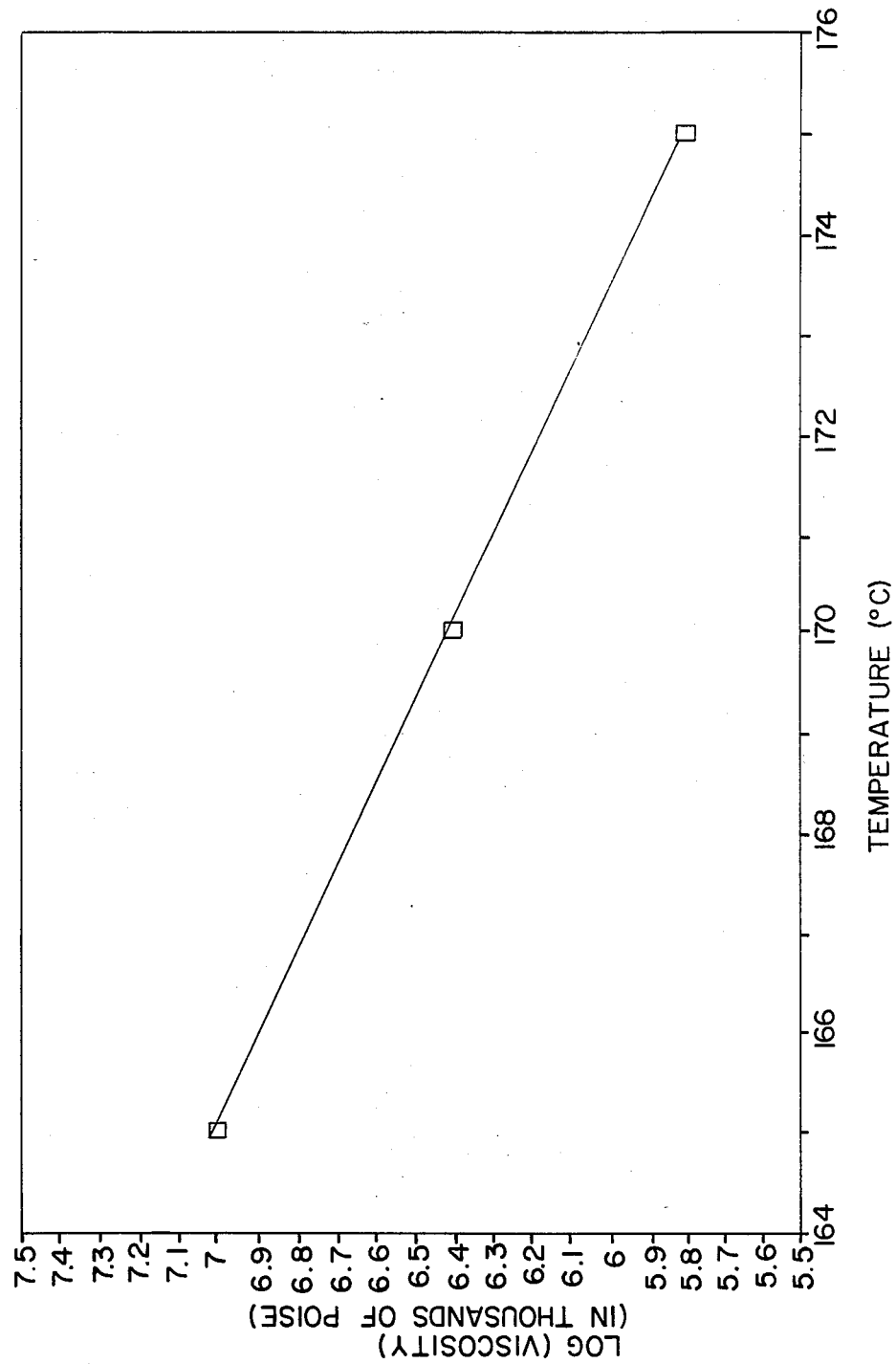

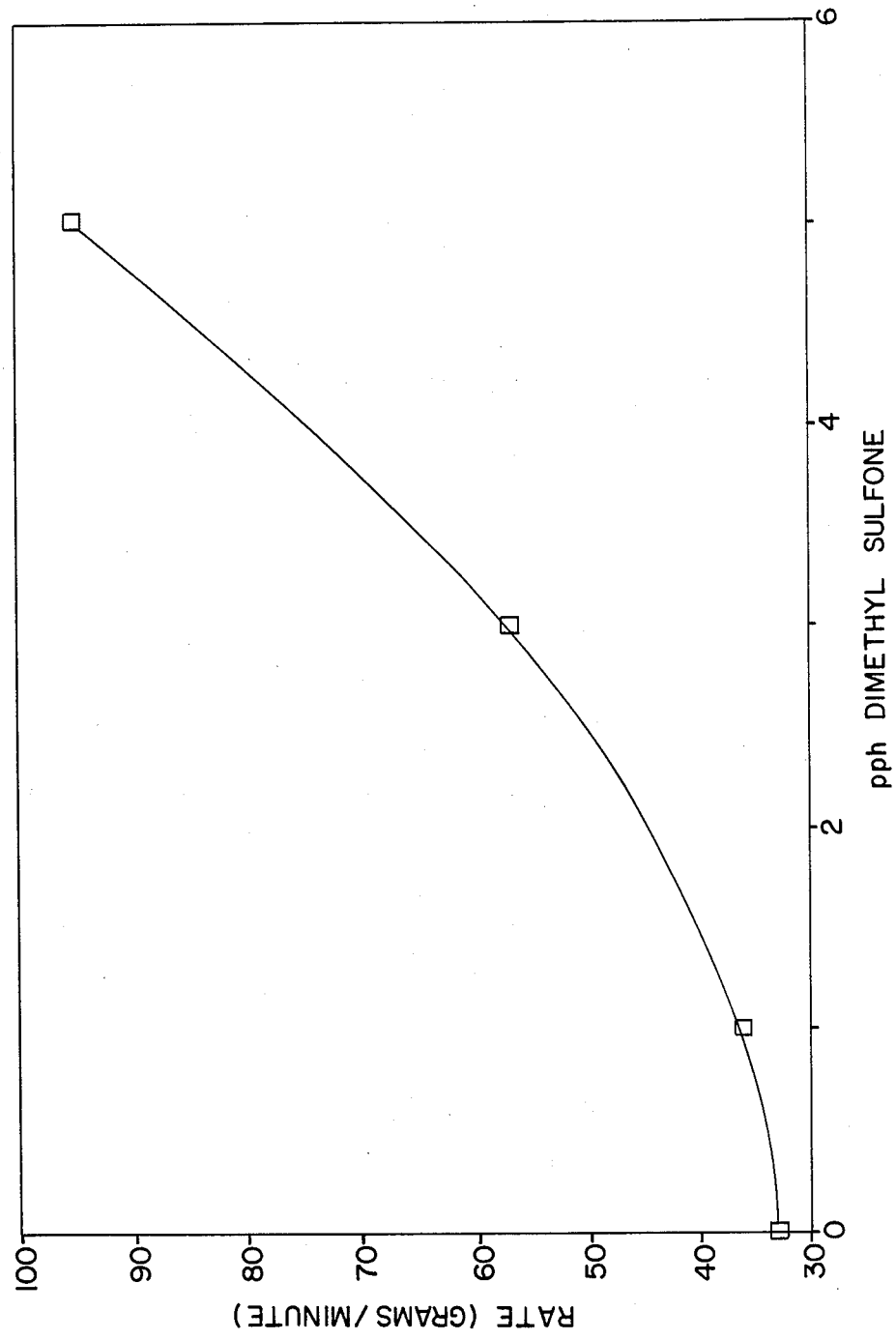

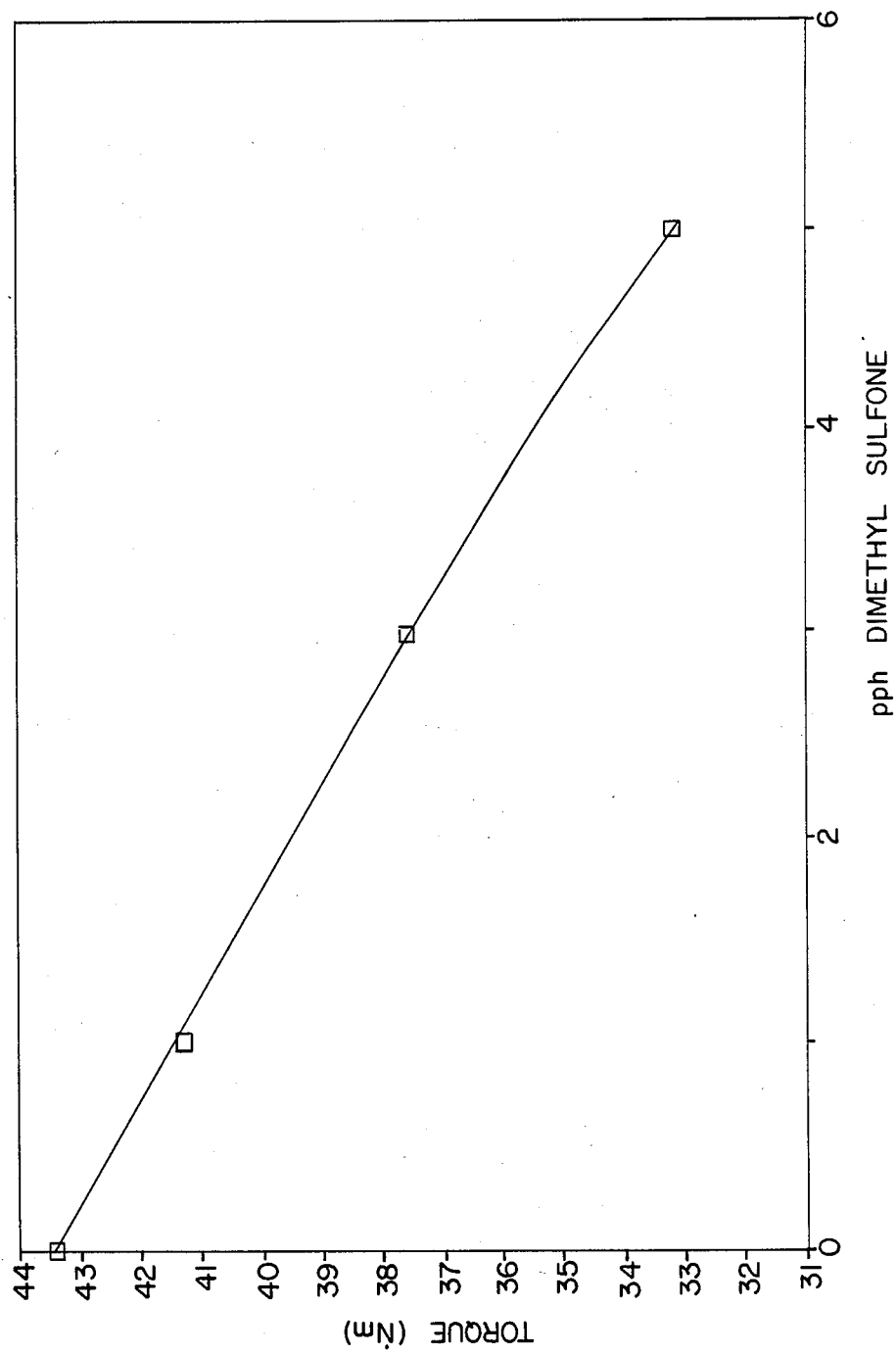

DIMETHYL SULFONE AS A SOLID SOLVENT FOR VINYLIDENE CHLORIDE CONTAINING POLYMERS

BACKGROUND OF THE INVENTION

The present invention relates to methods for reducing the melt viscosity of vinylidene chloride containing polymers and compositions useful in these methods.

Ideally a solid solvent stays in a vinylidene chloride containing polymer at a use temperature as a microdispersed solid with little or no adverse affect on the use properties of the vinylidene chloride containing polymer.

Yet when the vinylidene chloride containing polymer and the solid solvent melt at a given processing temperature, the solid solvent becomes a solvent for the vinylidene chloride containing polymer effectively reducing the melt viscosity of the vinylidene chloride containing polymer. A reduced melt viscosity allows the use of a lower processing temperature which reduces the potential for thermal degradation of the vinylidene chloride containing polymer.

Plasticizers and lubricants are presently utilized to reduce the melt viscosity of vinylidene chloride containing polymers. Both have drawbacks over the use of a solid solvent. A plasticizer remains as a liquid dissolved in the vinylidene chloride containing polymer at use temperatures and thus adversely affects use properties. A lubricant remains virtually as a separate phase at processing temperatures and thus is not as effective as a solid solvent in reducing the melt viscosity of vinylidene chloride containing polymers.

SUMMARY OF THE INVENTION

The present invention is a first composition of a vinylidene chloride containing polymer, having a majority of polymerized vinylidene chloride, and dimethyl sulfone; a second composition of a polymer capable of being blended with the vinylidene chloride containing polymer and dimethyl sulfone; and a third composition of any additive capable of being blended with the vinylidene chloride containing polymer and dimethyl sulfone.

The present invention is also a first method for processing, with reduced melt viscosity, the vinylidene chloride containing polymer with dimethyl sulfone; a second method for processing, with reduced melt viscosity, the vinylidene chloride containing polymer with a polymer containing dimethyl sulfone capable of being blended with the vinylidene chloride containing polymer: and a third method for processing, with reduced melt viscosity, the vinylidene chloride containing polymer with any additive containing dimethyl sulfone capable of being blended with the vinylidene chloride containing polymer.

The method is to combine the dimethyl sulfone directly, or the dimethyl sulfone as contained in a polymer or an additive with the vinylidene chloride containing polymer, heat the mixture to a melt temperature and process.

Surprisingly dimethyl sulfone or dimethyl sulfone present in a carrier, such as a polymer or an additive, when added to a vinylidene chloride containing polymer, reduces the melt viscosity of the vinylidene chloride containing polymer during processing.

A reduced melt viscosity will allow processing at lower temperatures and thus reduce the thermal degradation of the vinylidene chloride containing polymer.

BRIEF DESCRIPTION OF THE DRAWINGS

FIG. 1 illustrates the decrease in melt viscosity of a vinylidene chloride containing polymer versus the dimethyl sulfone concentration.

FIG. 2 illustrates the decrease in melt viscosity of a vinylidene chloride containing polymer versus temperature for one dimethyl sulfone concentration.

FIG. 3 illustrates the flow rate of a vinylidene chloride containing polymer at a constant extruder die pressure and temperature as a function of the dimethyl sulfone concentration.

FIG. 4 illustrates the decrease in torque needed to process a vinylidene chloride containing polymer versus the dimethyl sulfone concentration.

DETAILED DISCUSSION OF ILLUSTRATIVE EMBODIMENTS

Solid solvents are a new category of extrusion aids for vinylidene chloride containing polymers.

A solid solvent's compatibility with the vinylidene chloride containing polymer is dependent upon temperature.

At use temperatures the solid solvent has little or no compatibility and is a microdispersed solid in the vinylidene chloride containing polymer and has little or no effect on the desired use properties.

However at processing temperatures at or above which the vinylidene chloride containing polymer and the solid solvent melt, the solid solvent's compatibility with the vinylidene chloride containing polymer is increased to such an extent that the solid solvent acts as a solvent for the vinylidene chloride containing polymer and reduces the melt viscosity of the vinylidene chloride containing polymer.

This extrusion aid is not a plasticizer or an internal or external lubricant, as explained previously. Rather, this is a solid solvent, a different category of extrusion aid for vinylidene chloride containing polymers.

The solid solvents useful as extrusion aids for vinylidene chloride containing polymers are those solids which become more compatible with vinylidene chloride containing polymers upon melting, but become less compatible or incompatible with vinylidene chloride containing polymers upon cooling below the melting point of the solid solvent.

Preferably the solid solvent is a low molecular weight crystalline material having a melting point in the range of about 100° C. (degrees centigrade) to about 200° C. which, at use temperatures, is microdispersed in the vinylidene chloride containing polymer and crystallized.

A solid solvent concentration is about one-tenth(0.1) percent to about eighteen (18) percent by weight of the combination of the vinylidene chloride containing polymer and solid solvent. Preferably the range of the solid solvent is about one (1) percent to about ten (10) percent of the composition of the vinylidene chloride containing polymer and solid solvent.

One example of such a solid solvent is dimethyl sulfone.

Vinylidene chloride containing polymers are those homopolymers, copolymers, terpolymers, or interpolymers containing vinylidene chloride units ($-CH_2CCl_2-$). For example, other olefinically unsaturated monomers that are copolymerizable with vinylidene chloride include, but are not limited to, vinyl chloride, acrylonitrile and alkyl acrylates having one to eighteen carbon atoms. While solid solvents may be employed in any polymer having vinylidene chloride units, for the purposes of the present invention vinylidene chloride containing polymers refer to those vinylidene chloride containing polymers having a majority of vinylidene chloride units by weight of the polymer.

Various known additives are frequently incorporated into vinylidene chloride containing polymers. Such additives include, but are not limited to, plasticizers, ultraviolet light and thermal stabilizers, smoke or flame retardants, fillers and colorants.

Compositions having a reduced melt viscosity are those vinylidene chloride containing polymers containing the solid solvent as opposed to the same vinylidene chloride containing polymers containing no solid solvent. This composition can be the composition obtained during processing of the vinylidene chloride containing polymer after the solid solvent is added directly during the processing or this composition can be a composition of the vinylidene chloride containing polymer and the solid solvent that is in a form to be used for processing, such as for example, pellets or powder. The vinylidene chloride containing polymer can also contain an excess of solid solvent. This vinylidene chloride containing polymer having the solid solvent can then be blended with the vinylidene chloride containing polymers having no solid solvent.

Other compositions useful in reducing the melt viscosity of vinylidene chloride containing polymers are those polymers, including homopolymers, copolymers and interpolymers having no vinylidene chloride units or less than a majority of vinylidene chloride units, containing a solid solvent for vinylidene chloride containing polymers. These polymers must be capable of being blended with the vinylidene chloride containing polymers. Some examples of such polymers include, but are not limited to polyethylene, chlorinated polyethylene and ethylene-vinyl acetate copolymers.

Still other compositions useful in reducing the melt viscosity of vinylidene chloride containing polymers are those additives containing a solid solvent for vinylidene chloride containing polymers capable of being blended with the vinylidene chloride containing polymers.

Methods for processing the vinylidene chloride containing polymers so as to obtain a reduced melt viscosity include: a first method, (a) combining the solid solvent directly with the vinylidene chloride oontaining polymer; (b) heating the combination of (a) to a melt temperature: and (c) processing (b) into a final form; a second method, (a) combining a solid solvent containing polymer with no or less than a majority of vinylidene chloride units with the vinylidene chloride containing polymer while repeating steps (b) and (c); or a third method, (a) combining a solid solvent containing additive with the vinylidene chloride containing polymer while repeating steps (b) and (c).

Melt temperature refers to a temperature above which both the solid solvent and the vinylidene chloride containing polymer melt.

The concentration of the solid solvent in the vinylidene chloride containing polymer should be from about one-tenth percent to about eighteen percent by weight based on the weight of the solid solvent and the vinylidene chloride containing polymer.

Using any processing method, the solid solvent must be well dispersed in the vinylidene chloride containing polymer to reduce melt viscosity at or above the melt temperature and have little or no adverse effect on the use properties at a use temperature. This proper dispersion, called a microdispersion, can be confirmed utilizing a differential scanning calorimetry (DSC) technique. One machine useful for such a technique is a Perkin-Elmer DSC-4.

The following example illustrates a DSC technique and should not be construed as limiting the scope of the present invention. All parts and percentages in the example are by weight unless otherwise indicated.

EXAMPLE 1

Five (5) percent of dimethyl sulfone is mixed into a vinylidene chloride containing polymer powder. The mixture is heated to about 180° C. at a rate of about 10° C. per minute in a DSC cell.

The melting peak of the dimethyl sulfone is at about 112° C., and the vinylidene chloride containing polymer has two peaks at about 142° C. and about 157° C.

The mixture is then cooled to about $-40°$ C. at a rate of about 10° C. per minute to a solid and heated again as before.

The vinylidene chloride containing polymer containing the solid solvent has a glass transition temperature (Tg) at about 0° C., a recrystallization peak of the vinylidene chloride containing polymer at about 80° C., a dimethyl sulfone melting peak at about 109° C. and a vinylidene chloride containing polymer melting peak at 144° C.

The mixture is then quenched to $-40°$ C. and heated a third time as before.

The vinylidene chloride containing polymer has a Tg at about 4° C., a small dimethyl sulfone melting peak at about 75° C. and a very broad endothermic peak at about 170° C. with a shoulder at about 144° C.

As is seen in the second heating, the dimethyl sulfone recrystallizes out of the vinylidene chloride containing polymer upon cooling, while in the third heating the melting peak of the dimethyl sulfone is shifted significantly downward upon quenching indicating interaction between the dimethyl sulfone and the vinylidene chloride containing polymer.

While this is a good indication of interaction between dimethyl sulfone and the vinylidene chloride containing polymer, any potential solid solvent must still be studied with respect to the melt viscosity and the specific desired use properties, such as for example, extractability, effects on barrier properties and effects on mechanical properties.

More testing with a vinylidene chloride/vinyl chloride copolymer product designated XU32009.05 (available from The Dow Chemical Company) yields the results illustrated in FIGS. 1-4.

FIGS. 1-4 have dimethyl sulfone concentrations listed in pph (parts per hundred) by weight. This is easily converted to weight percent by adding the weight of the vinylidene chloride/vinyl chloride copolymer product and the solid solvent for a total weight and dividing the pph of dimethyl sulfone by this total. A Haake System 40 slit die rheometer is used to obtain the results of FIGS. 1-4.

In FIG. 1 illustrates the decrease in viscosity versus the dimethyl sulfone concentration. At a level of five (5) pph and a temperature of 175° C. the melt viscosity is nearly forty (40) percent lower than the vinylidene chloride/vinyl chloride copolymer with no dimethyl sulfone. The melt viscosity is measured at a shear rate of one hundred reciprocal seconds (100 L/sec).

FIG. 2 illustrates the decrease in melt viscosity versus temperature. At a level of five (5) percent by weight dimethyl sulfone, the vinylidene chloride/vinyl chloride copolymer can be extruded at a temperature 10° C. cooler than the vinylidene chloride/vinyl chloride copolymer with no dimethyl sulfone while also achieving about a twenty (20) percent melt viscosity reduction.

FIG. 3 illustrates the flow rate at a constant extruder die pressure of 1080 pounds per square inch and a temperature of 175° C. at various levels of dimethyl sulfone. At a level of five (5) pph the flow rate of the vinylidene chloride/vinyl chloride copolymer is increased almost by a factor of three. This indicates that vinylidene chloride containing polymers, in particular the vinylidene chloride/vinyl chloride copolymer, containing a solid solvent, such as dimethyl sulfone, can be extruded at increased rates over those vinylidene chloride containing polymers having no solid solvent.

FIG. 4 illustrates the torque needed to process the vinylidene chloride/vinyl chloride copolymer as a function of dimethyl sulfone concentration. Each point is an average of extruder torque readings taken at five different revolutions per minute (rpm), 30,60,90,120 and 150 at a temperature of 175° C. The torque (expressed in Newton-meters (Nm)) for a vinylidene chloride/vinyl chloride copolymer decreases about twenty-five (25) percent at a concentration of five (5) pph dimethyl sulfone versus no dimethyl sulfone. This indicates lower operating costs for an extruder and a decreased amount of energy input into the vinylidene chloride containing polymer for processing, thus reducing degradation.

Similar testing with other vinylidene chloride containing polymers, such as for example, a vinylidene chloride/methyl acrylate copolymer product designated XU32024.04 (available from The Dow Chemical Company) yields similar results.

One parameter often important when processing a vinylidene chloride containing polymer into a final form is oxygen permeability. Often one desires to obtain a low oxygen permeability. Addition of certain additives, such as for example, a plasticizer, can cause a large increase in oxygen permeability, even at low concentration levels, which may be unacceptable in the final form of the vinylidene chloride containing polymer. The addition of dimethyl sulfone at various concentrations to the vinylidene chloride/vinyl chloride and vinylidene chloride/methyl acrylate copolymers previously mentioned causes only a small increase in oxygen permeability.

In some extrusion testing, depending on particular processing methods, particular processing conditions and dimethyl sulfone concentration, some dimethyl sulfone vapors can be seen at or near an extrusion die. However this small amount of escaping vapor does not appear to adversely affect the present invention.

Concentrations levels of five (5) percent or more of dimethyl sulfone can cause whiteness and opaqueness depending on the processing conditions and the final form of the vinylidene chloride containing polymer, such as for example sheet, film, coatings or pellets.

The use of a solid solvent, such as for example dimethyl sulfone, in a vinylidene chloride containing compound is useful in many processing methods. These processing methods include, but are not limited to, extrusion and coextrusion processes, pellet producing processes, film producing processes, such as for example, a blown film process, and coating processes.

As is apparent, the present invention is capable of being embodied with various alterations and modifications which may differ particularly from those embodiments that have been described in this specification and description. For this reason, it is to be fully understood that all of the foregoing is intended to be merely illustrative and is not to be construed or interpreted as being restrictive or otherwise limiting of the present invention, excepting as it is set forth and defined in the claims.

I claim:

1. A method for processing, with reduced melt viscosity, vinylidene chloride containing polymers having a majority of polymerized vinylidene chloride in the polymer, comprising the steps of:
   (A) combining dimethyl sulfone and the vinylidene chloride containing polymer;
   (B) heating the combination of A to a temperature at which the combination of A is melted; and
   (C) processing B into a final form.

2. A method, as recited in claim 1, wherein the dimethyl sulfone is about one-tenth percent to about eighteen percent by weight of the combination in step A.

3. A method for processing, with reduced melt viscosity, vinylidene chloride containing polymers having a majority of polymerized vinylidene chloride in the polymer, comprising the steps of:
   (A) combining a polymer capable of being blended with the vinylidene chloride containing polymer containing dimethyl sulfone and the vinylidene chloride containing polymer;
   (B) heating the combination of A to a temperature at which the combination of A is melted; and
   (C) processing B into a final form.

4. A method, as recited in claim 3, wherein the dimethyl sulfone after performing step A is about one-tenth percent to about eighteen percent by weight of the solid solvent and the vinylidene chloride containing polymer.

5. A method for processing, with reduced melt viscosity, vinylidene chloride containing polymers having a majority of polymerized vinylidene chloride in the polymer, comprising the steps of:
   (A) combining an additive capable of being blended with the vinylidene chloride containing polymer containing dimethyl sulfone and the vinylidene chloride containing polymer;
   (B) heating the combination of A to a temperature at which the combination of A is melted; and
   (C) processing B into a final form.

6. A method, as recited in claim 5, wherein the dimethyl sulfone after performing step A is about one-tenth percent to about eighteen percent by weight of the solid solvent and the vinylidene chloride containing polymer.

* * * * *